United States Patent [19]

Corl

[11] Patent Number: 5,524,412

[45] Date of Patent: Jun. 11, 1996

[54] METHOD AND COMPOSITION FOR CONSTRUCTING MODULAR BUILDINGS

[75] Inventor: Donald L. Corl, Syracuse, Ind.

[73] Assignee: Eco Building Systems, Inc., San Diego, Calif.

[21] Appl. No.: 97,066

[22] Filed: Jul. 23, 1993

[51] Int. Cl.[6] .................................................... E04B 1/00
[52] U.S. Cl. .................. 52/745.19; 52/745.2; 52/435; 264/34; 454/186
[58] Field of Search .................. 52/745.19, 745.2, 52/745.21, 218, 219, 309.7, 309.12, 309.16, 309.17, 434, 435; 264/34, 35, 263, 46.7; 454/186, 185

[56] References Cited

U.S. PATENT DOCUMENTS

| | | | |
|---|---|---|---|
| 2,465,184 | 3/1949 | Alderman | 454/186 X |
| 3,303,770 | 2/1967 | Anthony | 454/186 |
| 3,965,635 | 6/1976 | Renkert | 264/46.7 X |
| 4,554,124 | 11/1985 | Sudrabin | 264/35 X |
| 4,605,529 | 8/1986 | Zimmerman | 264/263 |
| 4,619,032 | 10/1986 | Sudrabin | 264/263 |
| 4,856,238 | 8/1989 | Kesting | 456/186 |
| 5,339,589 | 8/1994 | Thrower | 52/741.1 |

Primary Examiner—Kien T. Nguyen
Attorney, Agent, or Firm—Brown, Martin, Haller & McClain

[57] ABSTRACT

A method of constructing modular wall and floor units, and modular manufactured buildings from such units, is disclosed. The use of a metal-compatible cementitious building material and a unique technique for panel formation allows for the simple and simultaneous formation of wall or floor panels and integration of those panels with the reinforcing and supporting frames to form "half sections" of modular building walls and floors. These half sections can then be readily provided with in-wall and through-wall services at the factory in a manner which permits the workers to have clear access to the appropriate sections of the building for easy installation of such services. Upon completion of the installation of services, the corresponding half sections can be joined to form fully integrated and framed units and buildings including walls, floors or ceilings with a minimum of effort. The invention has several interrelated aspects: the method of constructing the wall and floor members, the methods of constructing the modular building from those members, and a particular type of cementitious material which is uniquely suited for these construction methods.

15 Claims, 4 Drawing Sheets

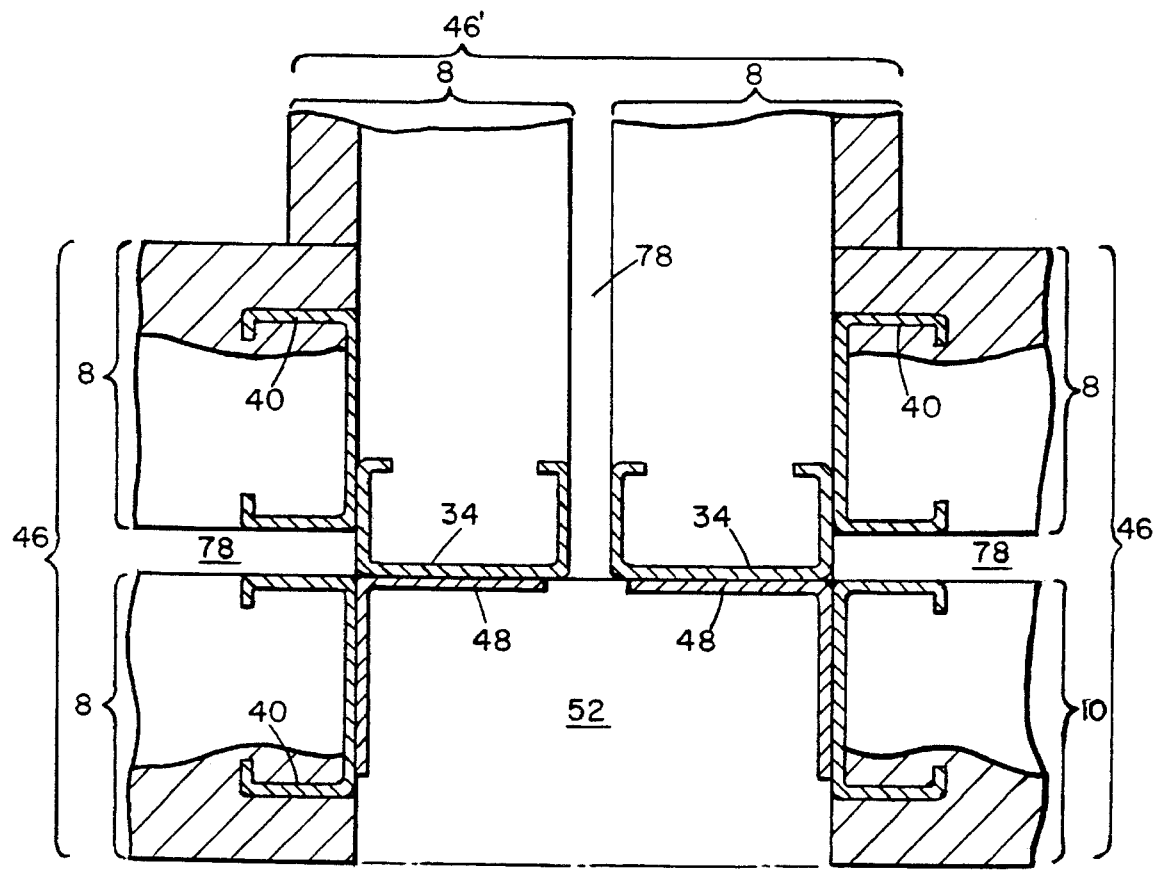
FIG. 8
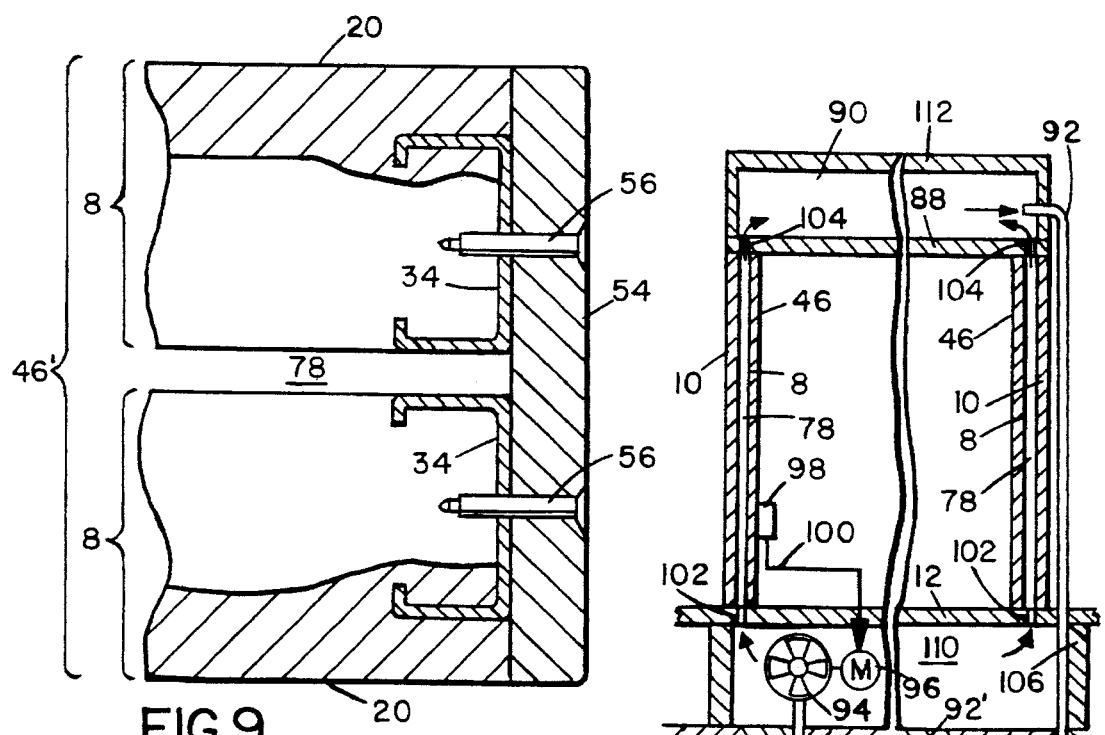
FIG.9
FIG.11

METHOD AND COMPOSITION FOR CONSTRUCTING MODULAR BUILDINGS

BACKGROUND OF THE INVENTION

1. Field of the Invention

The invention herein relates to the field of manufactured buildings. In particular it relates to methods of production of such buildings and the wall, floor and other components thereof.

2. Description of the Prior Art

Manufactured residential and commercial buildings (particularly manufactured housing) is a major segment of the construction industry. Manufactured buildings provide a great number of advantages in both construction procedures and costs as compared to on-site construction methods and site-constructed buildings. These advantages include uniformity of structure, ability to maintain a consistent construction schedule unaffected by weather, favorable working conditions for construction personnel, ability to have appropriate tools, equipment and materials available and properly maintained essentially at all times, speed of construction, and so forth.

A manufactured building is one which is constructed off-site, usually in a factory specifically designed for such construction, and which upon completion of the major construction phases is then transported to its ultimate location and there put in place on a previously constructed foundation or set of piers. Depending on the nature of the particular manufactured building and the scheduling previously determined by the builder and the owner, greater or lesser degrees of finish work will be left to be completed at the location site following attachment of the building to its foundation.

In addition, is the building is to be formed from several individual modular units, assembly of the building into the final overall structure from those units will be done on-site. Most manufactured housing is modular in nature, and the final size and shape of the building will be determined by the number of modules which are interlinked at the site.

A major step in the construction of any manufactured building is the fabrication of the framing for the walls, floors and often ceilings, and attachment to that framing to the interior and exterior wall and floor panels or "skins." In the past, whether the framing was formed of wood, metal or a combination thereof, the individual panels making up the exterior or interior surfaces of the walls or floors had to be separately assembled and then manually attached to the frame, often using the same time and labor intensive methods used in conventional on-site construction. Use of such techniques, of course, substantially reduces the economies of production which would otherwise be inherent in the manufactured housing procedures. The problem arises from the difficulty of joining the panels/skins and the frame into a unitary structure and at the same time of simplifying the inclusion of the necessary in-wall and through-wall components and services such as electrical, plumbing, heating/ventilation/air conditioning and like. Heretofore manufacturers have not been able to take full advantage of the efficiencies which are offered by manufactured housing, because at critical stages such as the attachment of the skins or panels to the frame and the incorporation of the in-wall and through-wall services, the old conventional on-site techniques have still had to be used.

It would therefore be advantageous to have a system for construction of manufactured buildings which would allow easy integration of panels and frames into unitary wall and floor units, a means for easily and conveniently allowing incorporation of all of the necessary in-wall and through-wall services, and simple completion of the wall and floor structure into a modular unit.

SUMMARY OF THE INVENTION

The invention herein provides such a system. The use of metal-compatible cementitious building material and a unique technique for panel formation, allows for the simple and simultaneous formation of wall or floor panels or skins and integration of those panels with the reinforcing and supporting frames to form "half sections" of modular building walls and floors. These half sections can then be readily provided with in-wall and through-wall services at the factory in a manner which permits the workers to have clear access to the appropriate sections of the building for easy installation of such services. Upon completion of the installation of services, the corresponding half sections can be joined to form fully integrated and framed walls, floors or ceilings with a minimum of effort.

Further, because of the two-section envelope wall construction, the buildings are particularly suitable for installation of efficient and low operational cost heating and cooling systems.

The invention has several interrelated aspects: the method of constructing the wall and floor members, the methods of constructing the modular building from those members, and a particular type of cementitious material which is uniquely suited for these construction methods. All will be described below.

In one aspect, the invention herein is a method for constructing wall and floor members from which to construct a modular building, the building comprising a floor member, a perimeter enclosure wall formed of a plurality of cooperating wall members, and a roof, each of the members comprising an integrated panel and frame; which method comprises forming a set of molds for molding the floor and wall members, each mold in the set having internal width and breadth dimensions equivalent to predetermined external width and breadth dimensions of at least one of the members; for each mold, partially filing the mold with a first layer of a cementitious composition compatible with direct contact with metal, the layer having a thickness less than the intended thickness of the panel and having an exposed surface; forming the frame having external width and breadth dimensions substantially coextensive with corresponding external dimensions of the panel, the frame comprising metal top and bottom plates joined by a plurality of metal studs; placing the frame on the exposed surface of the first layer with the plates and studs in contact with the surface, at least some of the plates and studs also having flanges extending generally parallel to the surface and adjacent thereto; partially filling the mold with a second layer of the composition, the second layer being such as to overlay and integrate with the first layer and also to cover and enclose the flanges to a depth equal to the intended depth of the panel; and fully hardening the first and second layers to form the panel and to cause the panel and the frame to be integrated to form the member through the enclosed flanges.

In another aspect, the invention involves a method for constructing a modular building, the building comprising a floor member, a perimeter enclosure wall formed of a plurality of cooperating wall members, and a roof, each of the members comprising an integrated panel and frame;

which method comprises forming a set of molds for molding the floor and wall members, each mold in the set having internal width and breadth dimensions equivalent to predetermined external width and breadth dimensions of at least one of the members; for each mold, partially filing the mold with a first layer of a cementitious composition compatible with direct contact with metal, the layer having a thickness less than the intended thickness of the panel and having an exposed surface; forming the frame having external width and breadth dimensions substantially coextensive with corresponding external dimensions of the panel, the frame comprising metal top and bottom plates joined by a plurality of metal studs; placing the frame on the exposed surface of the first layer with the plates and studs in contact with the surface, at least some of the plates and studs also having flanges extending generally parallel to the surface and adjacent thereto; partially filling the mold with a second layer of the composition, the second layer being such as to overlay and integrate with the first layer and also to cover and enclose the flanges to a depth equal to the intended depth of the panel; and fully hardening the first and second layers to form the panel and to cause the panel and the frame to be integrated to form the member through the enclosed flanges; further forming all of the members in like manner; and attaching the wall members to the floor member, joining the wall members to each other to form the enclosure wall, and securing the roof atop the enclosure wall to form the building.

In yet another aspect, the invention involves a composition useful for formation of wall and floor members for a modular building which comprises, in parts by weight: 15–30 parts of portland cement, 4–12 parts of inorganic fibers, 0.2–2.0 parts of acrylic polymer, 50–70 parts of sand, and 4–12 parts of water. The preferred inorganic fiber is glass fiber. Gypsum can also be present as up to 40% of the portland cement component.

BRIEF DESCRIPTION OF THE DRAWINGS

FIG. 8 is an enlarged sectional view of the wall junction structure circled at 8 in FIG. 6;

FIG. 9 is an enlarged sectional view of the end frame structure circled at 9 in FIG. 6;

FIG. 11 is a schematic illustration of a heating and cooling system which can be incorporated in the building to take advantage of the two-section wall structure.

DETAILED DESCRIPTION AND PREFERRED EMBODIMENTS

Figure 6:
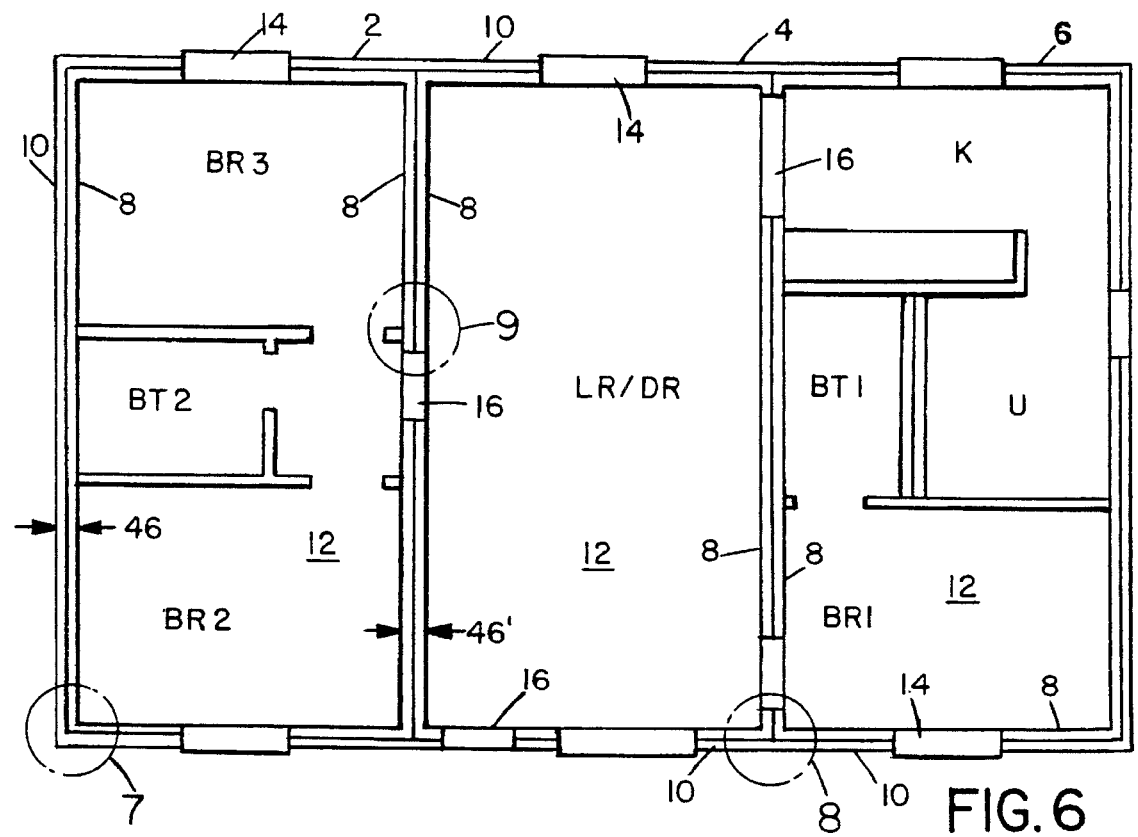
FIG. 6 is a typical home floor plan utilizing the modular units of this invention.

The invention will be best understood by reference to the drawings, considering first FIG. 6. FIG. 6 is a plan view of a "three-box" (three unit) manufactured building, in this case exemplified as a 3-bedroom, 2-bath residence. The overall building is constructed of three modular units designated respectively 2, 4 and 6. These are showing as being of identical rectangular shape and are abutted along their long sides to form the overall building. As will be evident, buildings of this invention can also be constructed using modular units which are unequal in size or shape and which are aligned or abutted along different walls or portions of the walls.

Each module is constructed with a floor 12 and an exterior perimeter enclosure wall 46, each of which is made up of an inner wall 8 and an outer wall 10. Where two modules abut, there is an interior junction wall 46' which is made up of two adjacent inner walls 8. There will be appropriate cut-outs in the walls 46 and 46' for windows 14 and doorways 16. In the floor plan shown in FIG. 6, module 2 contains two bedrooms (BR2, BR3) and one bathroom (BT2), the central module 4 is shown as an undivided living room/dining room (LR/DR) open area, and module 6 contains the kitchen (K), a utility room (U), an additional bedroom (BR1) and an additional bathroom (BT1). It will be evident to those skilled in the art that a wide variety of different floor plans and interior arrangements can be accommodated using one or more modules, and this particular design shown is merely one typical example.

Figure 1:
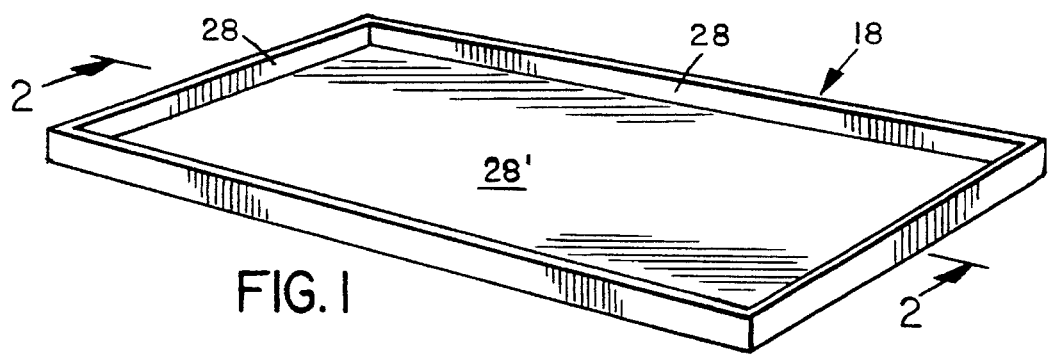
FIG. 1 illustrates a typical mold for a rectangular panel.
Figure 2:
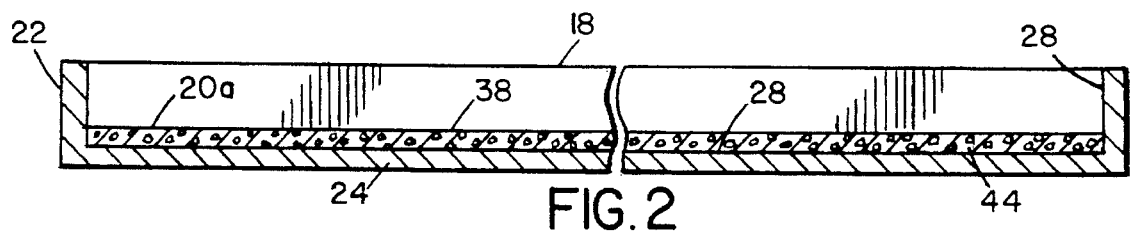
FIG. 2 is an enlarged sectional view taken on line 2—2 of FIG. 1 showing a poured layer of composition in place to form a panel pre-form.
Figure 3:
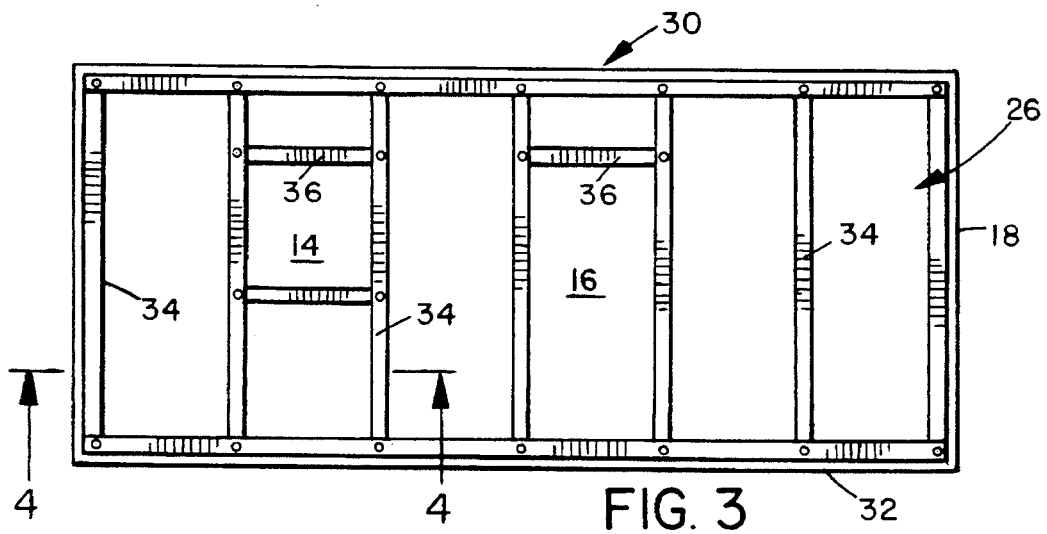
FIG. 3 is a top plan view of a typical frame assembly installed in the mold on top of the panel preform.

The individual modules (or "boxes") 2, 4 and 6 are constructed separately at the factory and then transported to the location site and interlinked at that site. The overall manufacturing process will be discussed in more detail with respect to the description of FIG. 10. The various individual steps critical to formation of the unique panel-and-frame members will be best understood by reference to the series of drawings, beginning with FIG. 1. FIG. 1 illustrates a mold 18 (usually rectangular) which may be formed of plastic, fiberglass, metal, wood or any other convenient material which will not be attacked or aggressive to the composition from which the wall panels are to be formed and from which the finished panel/frame member can be readily unmolded upon completion of the fabrication procedure. The mold 18 is a flat shallow mold, whose interior length and breadth are equivalent to the desired breath and length of the wall or floor panels 20 which are to be molded. The mold walls 22 rise above the base 24 to a height not less than the desired thickness of the panel 20. Preferably the walls will extend somewhat further, as illustrated in FIG. 2, to accommodate molding of panels of different thicknesses and to aid in guidance of the frame 26 into position to be integrated with the panel 20 as will be described above. It is convenient for each mold to be of sufficient strength to be able to support the weight of the formed panel and frame, so that underlying supports are not needed. In addition, this will permit the molds to be mounted on wheels or casters (not shown) and thus moved around the factory floor for use and assembly of components as needed (as will be discussed with respect to FIG. 10).

Prior to molding, the mold 18 is coated on the inside surfaces 28 with a conventional mold release agent, to aid in the subsequent unmolding of the finished panel/frame member. If desired, a layer of inorganic (preferably glass) fiber may also be placed in the mold where it will become concentrated in the surface of the molded panel. Thereafter the first layer 20a of the cementitious composition is poured into the mold.

Figure 4:
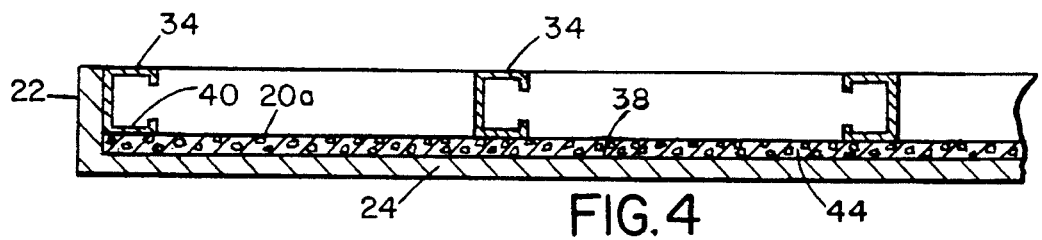
FIG. 4 is an enlarged sectional view taken on line 4—4 of FIG. 3.
Figure 7:
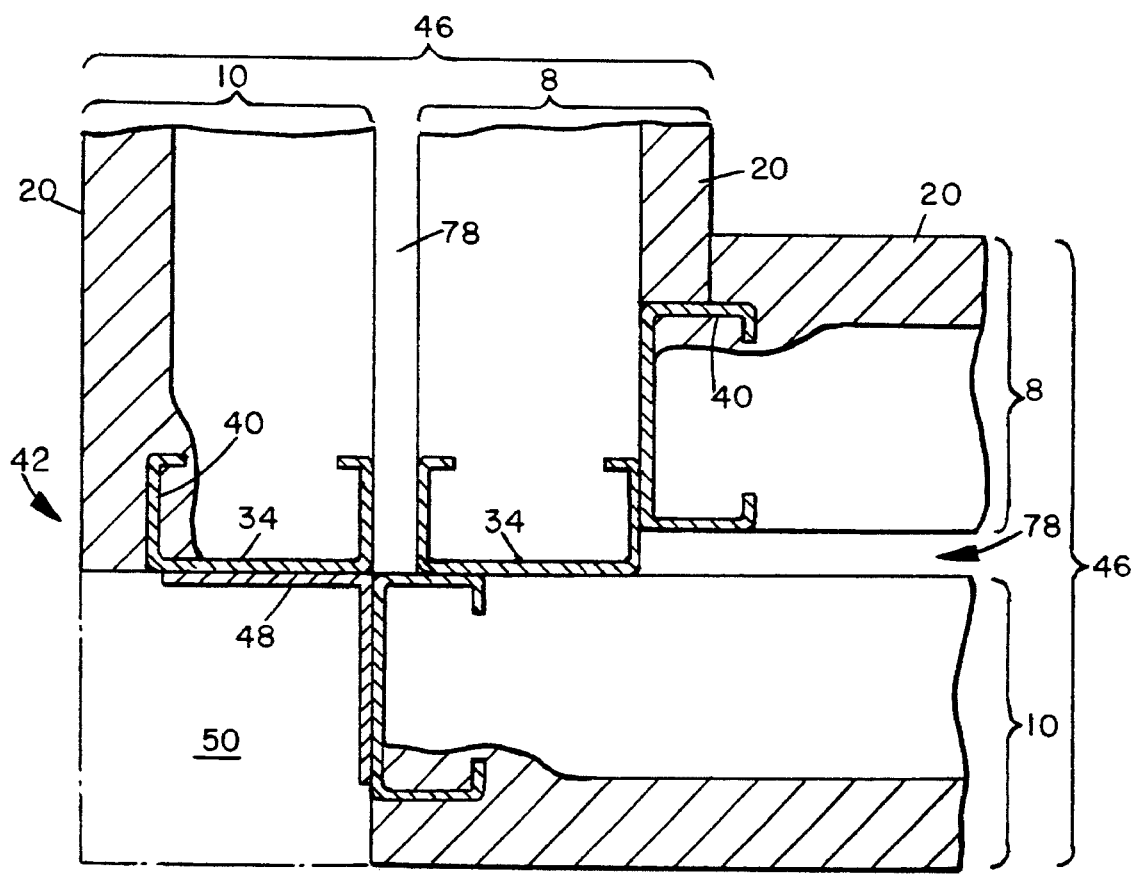
FIG. 7 is an enlarged sectional view of the corner structure circled at 7 in FIG. 6.

Meanwhile, fabrication of the frame 26 for that particular wall or floor panel will have been completed. The frame 26 (which will be discussed herein as a wall frame) is formed of a top plate 30 and a bottom plate 32. Both of these are commonly in the form of metal channels as is shown in FIG. 7. The top and bottom plates 30 and 32 are joined by studs 34 to provide a conventionally shaped wall frame. Where appropriate, provision in made in the framing for windows 14 and doorways 16, by means of the appropriate headers 36. The studs are also made of metal channel members as illustrated in FIG. 4.

Figure 5:
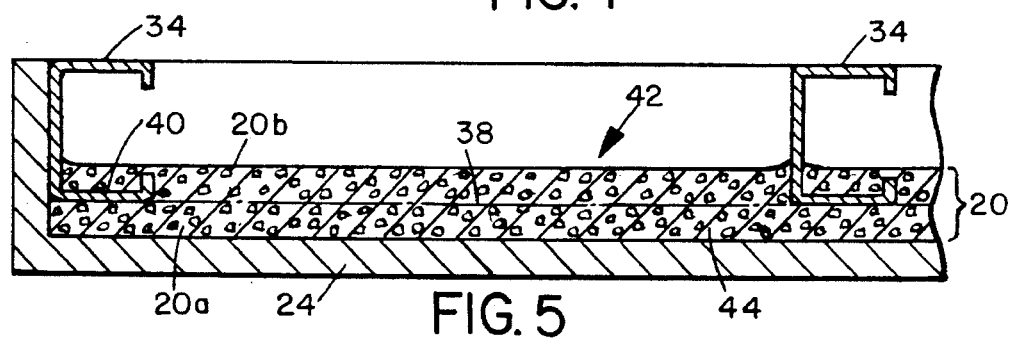
FIG. 5 is a further enlarged view of a portion of FIG. 4, showing the second poured layer applied over the panel pre-form layer and the flanges of the frame.

The frame 26 is then laid into the mold to rest on top of the exposed surface 38 of the layer 20a, and the frame 26 is aligned with the edges of the layer 20a by the walls 22 of the form 18. A second layer 20b of the cementitious material is then poured into the mold 18 to a depth sufficient to cover at least one flange portion 40 of each individual stud 34 and top and bottom plates 30 and 32, as exemplified in FIG. 5. The overall combined width of the layers 20a and 20b will constitute the overall desired width of the panel 20. The entire system is then allowed to cure to a complete set, with the layers 20a and 20b integrating with each other and enclosing and incorporating the flange portions 40 of the studs 34, top plate 30 and bottom plate 32 securely into the interior of panel 20, as illustrated in FIG. 7.

As noted, this procedure has been illustrated with respect to a wall panel and the terminology of "studs," "top plates" and "bottom plates." It will be evident, however, that the same construction will be used for formation of floor and ceiling panels which will have corresponding elements labeled according to the conventional terminology for such floors and ceilings. The structures, however, will be substantially identical. There may also be appropriate cutouts in the floors or ceilings for stairways, chimneys, vent exhausts, skylights and the like, in the same manner that the windows 14 and doorways 16 are provided in the wall panels.

Once the unitary panel/frame member (designated 42) has completely cured and reached the desired degree of hardness and strength, it can be removed from the mold 18 by conventional demolding techniques. Preferably the mold will have been constructed so that it can be reused for manufacture of subsequent panel/frame members 42. Alternatively it may been formed as a one-time-use mold which is destroyed during the unmolding.

It will also be evident that the interior bottom surface of the mold (designated 28' in FIG. 1) can be provided with any desired pattern (in negative form) which will be reproduced in positive form in the corresponding surface 44 of the panel 20, in order to provide a pleasing appearance to the outer surface of the member 42. Typical patterns include simulation of the appearance of wood, brick, tile, stucco or the like.

Once member 42 has been completed and removed from the mold 18, the appropriate cuts through the panel 20 will be made to provide the windows 14 and doorways 16 aligned with the corresponding framing studs 34 and headers 36.

Once sufficient numbers of the panels have been formed, they will be assembled by first laying the floor panel 12 in position and then erecting and interconnecting the various members 42 constituting the inner wall 8 around the perimeter of the floor 12, as indicated in FIG. 6, with the finished surface of panel 20 facing inward (to form the inside wall of the room). This leaves the open frame side of the member 42 exposed, which in turn provides for easy access by workers to install the various in-wall and through-wall services, such as electrical wiring and HVAC ducting. Thereafter the members 42 constituting the outer wall 10 will be secured to the floor 12 and to each other in parallel with the inner wall 8. A space 78 (of 6"–12" (15–30 cm) in width) is preferably left between the walls 8 and 10 for purposes to be described below. Thermal and/or sound insulation may be installed in the members before or after assembly into the finished wall 46, depending on whether the insulation is in the form of solid batts or is blown into the interior of the wall 46 as foam or loose fiber fill. The interior wall 8 and exterior wall 10 members 42 will be secured to each other at the top by clips. Outside corners will be secured as shown in FIG. 7 and the two abutting finished wall sections 42 will be joined by an L-shaped member 48. Similarly, where three walls meet as shown in FIG. 8, the abutting members 42 will be joined by a pair of L-shaped members 48. The remaining open spaces 50 and 52 may be left open or will conveniently be covered by an appropriate filler (not shown) which either blends or contrasts with the outer surface of the outer wall 10. As shown in FIGS. 7 and 8, shape offset accommodation will be made in the molding of the individual panels to allow for interfitting of abutting panels at the corners or joints. Those skilled in the art will be able to block the molds accordingly to provide these offsets.

Where there are openings in a wall, as with doorways 16 shown in FIG. 9, one may conveniently install an end cap 54 by fastening through the stud 34 with conventional screws 56 or by welding the end cap 54 to a stud 34. The outer appearance of the end cap 54 may be sufficient by itself to provide for an archway effect or it may serve as the attachment point for the conventional framing of a door jamb.

Figure 10:
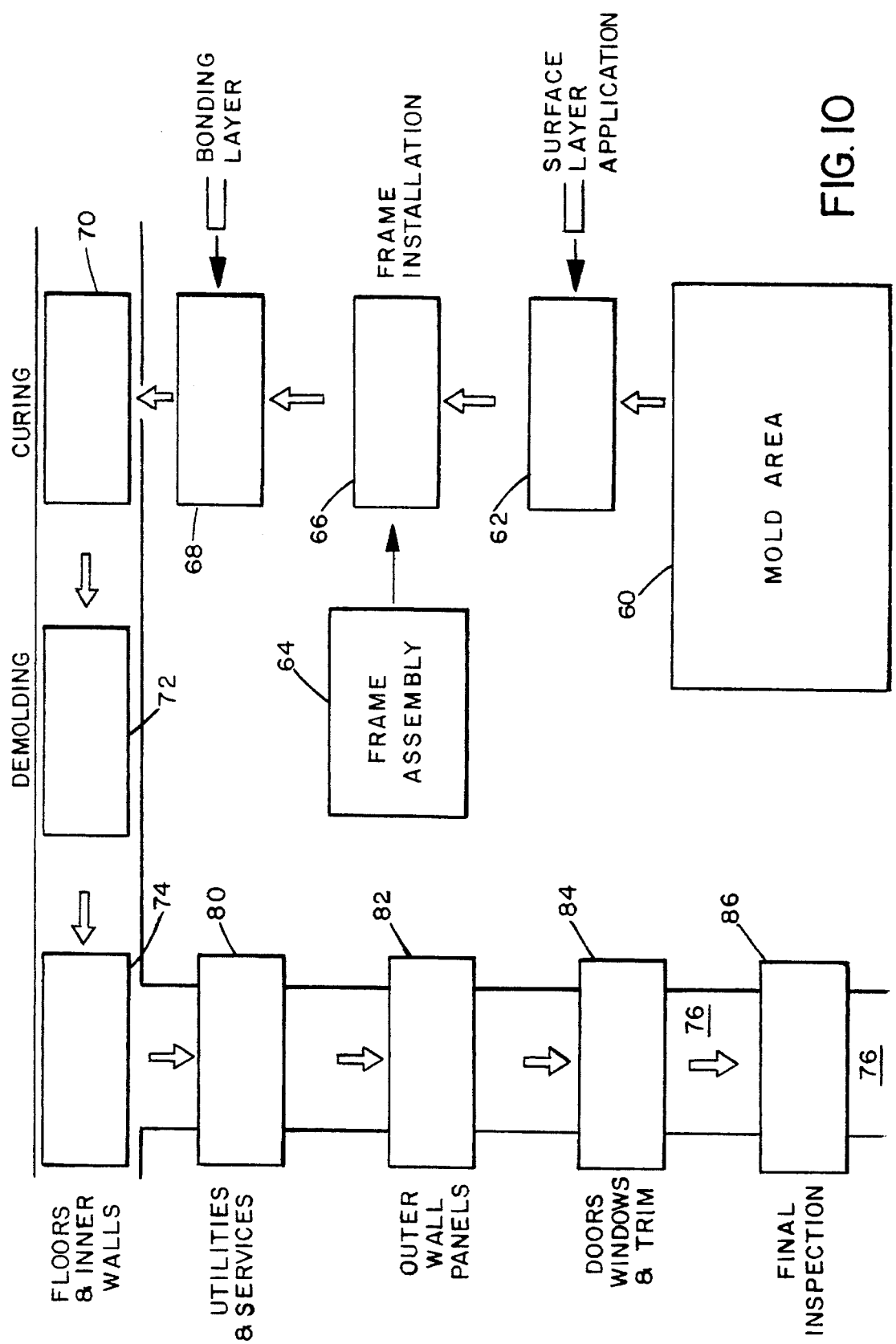
FIG. 10 is a diagram showing the sequence of assembly steps of members and modular buildings of this invention.

The overall production process is illustrated schematically in FIG. 10. The molds are built in mold area 60, preferably with wheels or casters. Each mold is then moved as required to first position 62 in which the pre-form layer 20a is poured and allowed to partially cure. Meanwhile a corresponding frame 26 is assembled in area 64. When the curing is sufficiently progressed and the frame is completed, the frame is placed into the mold 18 in contact with the pre-form 20a in area 66. Thereafter, the mold is normally moved to area 68 where the second layer 20b is added. The mold is then moved to curing area 70 where the final cure and set takes place.

Thereafter the panel/frame member 42 is demolded in area 72 and moved to area 74 at the head of the assembly line 76. In area 74 a floor panel is placed on a carriage (not shown) and the panel/frame wall members 42 of inner wall 8 are erected around its perimeter, with the framing side of the members 42 open to what will be the interior space 78 of the finished wall 46. This semi-finished unit is then moved to area 80 where all of the various utilities and services, including electrical, plumbing, HVAC ducting and the like are installed. This installation is greatly simplified by the fact that the installer has full access of the inside of the wall without the need to fish lines or conduits through the wall. Insulation may also be installed at this point.

After the utilities and services are all roughed in, the unit is moved to area 82 where the members 42 forming outer wall 10 are installed, thus forming a finished wall 46 with the utilities and services fully enclosed therein. Thereafter the unit moves on to area 84, where doors, windows and trim are added and finally to area 86 for a final inspection before being transported to the designated on-site building location. The units are conveniently sized with width and breadth dimensions such that they may be moved by conventional highway transport. For instance, it is contemplated that many units will be formed based on a floor dimension of 13'-9"×27'-6" (4.2×8.4 m), which permits normal highway haulage. Wall heights will usually be the conventional 8'-0" (2.4 m). The ceiling may be installed prior to transport to the site or may be installed at the site, followed by installation of the roof.

Because of the dual-wall structure with the preferred interior space 78, one may if desired also install a highly efficient and low operating cost heating and cooling system as shown in FIG. 11. When the building is set on its foundation 106 there will be formed a crawl space 110 beneath the floor 12. The walls 46 rise from the floor 12 to the ceiling 88. Above ceiling 88 is roof 112, with an attic space 90 between the roof 112 and ceiling 88. A pipe or similar air conduit 92 runs from the attic space 90 down to the ground 108 under the building where it is embedded in a trench as shown at 92'. (The pipe 92 is shown a running down the outside of the building for clarity in FIG. 11, but in practice it would be passed through one of the open spaces 78.) After passing through the ground 108 the pipe emerges and is attached to the inlet of fan or pump 94. There are a series of holes 102 cut through floor 12 to provide air communication from crawl space 110 into the various spaces 78 around the perimeter wall 46. A similar series of holes 104 provide for air communication between the spaces 78 and attic space 90. In operation, fan 94, driven by motor 96, draws air out of the attic space 90 through pipe 92. As the air passes through that portion 92' of the pipe which is embedded in the ground 108, the air becomes heated or cooled to or about the temperature of the ground 108. The heated/cooled air in then distributed by fan 94 into the crawl space 110 from which it passes through holes 102 into the spaces 78 and passes upward through the interior of the walls 46. The air, having approximately ground temperature, conversely cools or heats the interior of the building and then passes through holes 104 into the attic space 90, from which it is continually recirculated to maintain the building temperature. The fan 94 is controlled by thermostat 98 which is connected by wires 100 to motor the control circuitry of motor 96. Power for the fan motor 96 may come from ordinary municipal sources or from solar electrical panels, placed for instance on the roof 112.

Critical to the success of the present invention is the use of a unique cementitious material for the composition for the formation of the panels 20. This composition must be such as to be compatible with direct metal contact and be able to enclose and secure the flanges 40 of the various metal frame components. It must also be substantially chemically inert, so that it does not actively attack, corrode, or oxidize the metal. The basic composition is described in the table below, with the various concentration ranges stated in parts by weight.

TABLE

| Components | Quantity Ranges | | |
| --- | --- | --- | --- |
| | Maximum | Preferred | Most Preferred |
| Portland Cement | 15–30 | 18–27 | 20–25 |
| Inorganic Fibers | 4–12 | 5–10 | 6–10 |
| Acrylic Polymer | 0.2–2.0 | 0.5–1.5 | 1.0–1.4 |
| Sand | 50–70 | 55–65 | 57–63 |
| Water | 4–12 | 5–10 | 6–10 |

Commercial portland cements useful as the component herein will commonly include about 5%–11% gypsum as a curing agent. Optionally more gypsum may also be added up to about 40% of the portland cement component. The incorporation of gypsum into the panels 20 of the inner walls 8 accelerates the cure of the panel 20. In addition, the increased gypsum content provides a somewhat softer surface which will readily accommodate picture hooks, nails and such, in the manner of conventional wallboard. This will allow the normal decorating of interior surfaces with pictures and other articles on the walls. The outer panels 20, which contain no gypsum, will be much harder and more like exterior stucco or regular cement finish, to provide weather-resistance.

A particularly preferred composition for the wall panels, particularly the outer panels, is one comprising 22.4 parts of portland cement, 7.9 parts of inorganic fiber (glass fiber), 1.2 parts of acrylic polymer, 60.6 parts of sand and 7.9 parts of water.

The portland cement and gypsum useful herein may be any suitable grade of commercial portland cement and/or gypsum. Extensive descriptions of both will be found in numerous references, typical of which are Shreve et al. *Chemical Process Industries* (4th edn.: McGraw-Hill Book Co., 1977), chapter 10; Considine, ed., *Scientific Encyclopedia* (7th edn.: Van Nostrand Reinhold, 1989), pages 548–550 and 1392–1393; and Urquhart, ed., *Civil Engineering Handbook* (4th edn.: McGraw-Hill Book Co., 1959).

Acrylic polymers suitable for use in this invention are widely described in the literature. See, for instance, Seymour, *Engineering Polymer Sourcebook* (McGraw-Hill Book Co., 1990), chapter 8; Rubin, ed., *Handbook of Plastic Materials and Technology* (John Wiley & Sons, Inc., 1990), chapter 32; and Luke, *Modern Plastics Encyclopedia*, 64 (10A), 13–14 (1987). The acrylic materials are primarily based on poly(methyl methacrylate). A particularly preferred acrylic material for use in the present invention is a acrylic latex sold under the trade designation "Forton VF 774" by Forton PGFRC Inc./Ball Consulting Ltd. of Ambridge, Pa. This material has a solids content of approximately 51%, a milky white appearance, a viscosity at 25° C. of about 150 mPa, solid particle sizes in the range of about 150–200 nm, a specific gravity of 1.0–1.2, and a pH of about 5.

Similarly, various types of suitable inorganic reinforcing fibers are also widely described in the literature. See, for instance, Rubin, supra, chapters 59, 60 and 64 (the preferred glass fibers are discussed in chapter 60); and Feinberg, *Modern Plastics Encyclopedia*, 64 (10A), 185–186 (1987). Glass fibers are particularly preferred because of their well-established reinforcing, handling and mixing properties, ready commercial availability, lack of color and low cost, although other inorganic fibrous materials such as mineral fibers and carbon fibers may also be useful. Organic fibers are not usually chemically compatible with the portland cement matrix. Commonly the fibers will be in the form of "chopped" short fibers, having fiber lengths of about 1–1½ inch (25–37 mm). Equipment for chopping fiber to length while simultaneously spraying the fiber in the mold is commercially available and recommended for use in this invention; see Feinberg, supra. Virgin or recycled fiber may be used; use of recycled fiber is advantageous because it provides for beneficial utilization of materials which would otherwise require disposal as waste.

Those skilled in the art will be readily able to select the particular choice of each of the above materials best suited for practice of this invention under any specific circumstances from the variety of commercially available materials.

It will be evident from the above that there are many other variations which, while not expressly described above, are clearly within the scope and spirit of the invention. The description above is therefore to be considered exemplary only, and the actual scope of the invention is to be limited only by the appended claims.

I claim:

1. A method for constructing wall and floor members from which to construct a modular building, said building comprising a floor member, a perimeter enclosure wall formed of a plurality of cooperating wall members, and a roof, each of said members comprising an integrated panel and frame; which method comprises:

forming a set of molds for molding said floor and wall members, each mold in said set having internal width and breadth dimensions equivalent to predetermined external width and breadth dimensions of at least one of said members;

for each mold, partially filling said mold with a first layer of a cementitious composition compatible with direct contact with metal members of said frame, said layer having a thickness less than the intended thickness of said panel and having an exposed surface;

forming said frame having external width and breadth dimensions substantially coextensive with corresponding external dimensions of said panel, said frame comprising metal top and bottom plates joined by a plurality of metal studs;

placing said frame on said exposed surface of said first layer with said plates and studs in contact with said surface, at least some of said plates and studs also having flanges extending generally parallel to said surface and adjacent thereto;

partially filling said mold with a second layer of said composition, said second layer being such as to overlay and integrate with said first layer and also to cover and enclose said flanges to a depth equal to the intended depth of said panel; and fully hardening said first and second layers to form said panel and to cause said panel and said frame to be integrated to form said member through said enclosed flanges.

2. A method as in claim 1 wherein said composition comprises, in parts by weight: 15–30 parts of portland cement, 4–12 parts of inorganic fibers, 0.2–2.0 parts of acrylic polymer, 50–70 parts of sand, and 4–12 parts of water.

3. A method as in claim 2 wherein said composition comprises, in parts by weight: 18–27 parts of portland cement, 5–10 parts of inorganic fibers, 0.5–1.5 parts of acrylic polymer, 55–65 parts of sand, and 5–10 parts of water.

4. A method as in claim 3 wherein said composition comprises, in parts by weight: 20–25 parts of portland cement, 6–10 parts of inorganic fibers, 1.0–1.4 parts of acrylic polymer, 57–63 parts of sand, and 6–10 parts of water.

5. A method as in claim 2 wherein said portland cement also contains up to 40% of gypsum.

6. A method as in claim 1 wherein a layer of inorganic fibers is placed into at least one of said molds prior to partially filling of said mold with said first layer of cementitious material.

7. A method as in claim 6 wherein said inorganic fibers comprise glass fibers.

8. A method for constructing a modular building, said building comprising a floor member, a perimeter enclosure wall formed of a plurality of cooperating wall members, and a roof, each of said members comprising an integrated panel and frame; which method comprises:

forming a set of molds for molding said floor and wall members, each mold in said set having internal width and breadth dimensions equivalent to predetermined external width and breadth dimensions of at least one of said members;

for each mold, partially filling said mold with a first layer of a cementitious composition compatible with direct contact with metal, said layer having a thickness less than the intended thickness of said panel and having an exposed surface;

forming said frame having external width and breadth dimensions substantially coextensive with corresponding external dimensions of said panel, said frame comprising metal top and bottom plates joined by a plurality of metal studs;

placing said frame on said exposed surface of said first layer with said plates and studs in contact with said surface, at least some of said plates and studs also having flanges extending generally parallel to said surface and adjacent thereto;

partially filling said mold with a second layer of said composition, said second layer being such as to overlay and integrate with said first layer and also to cover and enclose said flanges to a depth equal to the intended depth of said panel; and fully hardening said first and second layers to form said panel and to cause said panel and said frame to be integrated to form said member through said enclosed flanges;

further forming all of said members in like manner; and arranging said wall members in two parallel rows around the perimeter of said floor member, joining said wall members to each other to form said enclosure wall and to said floor member and create an interior space enclosed by said wall, and securing said roof atop said enclosure wall to form said building.

9. A method as in claim 8 wherein said composition comprises, in parts by weight: 15–30 parts of portland cement, 4–12 parts of inorganic fibers, 0.2—2.0 parts of acrylic polymer, 50–70 parts of sand, and 4–12 parts of water.

10. A method as in claim 9 wherein said composition comprises, in parts by weight: 18–27 parts of portland cement, 5–10 parts of inorganic fibers, 0.5–1.5 parts of acrylic polymer, 55–65 parts of sand, and 5–10 parts of water.

11. A method as in claim 10 wherein said composition comprises, in parts by weight: 20–25 parts of portland cement, 6–10 parts of inorganic fibers, 1.0–1.4 parts of acrylic polymer, 57–63 parts of sand, and 6–10 parts of water.

12. A method as in claim 9 wherein said portland cement also contains up to 40% of gypsum.

13. A method as in claim 9 further comprising:

said wall members in parallel rows being spaced apart with an air space therebetween;

said building also comprising a ceiling disposed at the top of said wall members and below said roof and spanning said interior space;

providing a first enclosed plenum space below said floor and a second enclosed plenum space between said ceiling and said roof;

providing first air communication means providing air communication between said interior space and each of said first and second plenum spaces;

providing second air communication means providing air communication between said first and second plenum spaces, a portion of said second air communication means providing for heating and cooling of air contained therein by contact with earth; and providing fan means operably connected to said second air communication means for withdrawing air from said second plenum space, passing said withdrawn air through means for changing the temperature of said air by said contact with earth, discharging said air into said first plenum space, and causing said air to pass through said first air communication means and said interior space and return to said second plenum space, whereby said passage through said interior space provides heating and cooling to said building interior.

14. A method as in claim 8 wherein a layer of inorganic fiber is placed into at least one of said molds prior to partially filling of said mold with said first layer of cementitious material.

15. A method as in claim 14 wherein said inorganic fibers comprise glass fibers.

* * * * *